United States Patent [19]

Kecik

[11] 3,990,405
[45] Nov. 9, 1976

[54] ROTARY INTERNAL COMBUSTION ENGINE

[76] Inventor: Joseph Kecik, 1732 N. Wood St., Chicago, Ill. 60622

[22] Filed: Feb. 21, 1975

[21] Appl. No.: 551,660

[52] U.S. Cl. .............................. 123/8.13; 123/8.47; 418/36; 418/38; 418/210; 74/70
[51] Int. Cl.² ........................................ F02B 53/04
[58] Field of Search ............ 123/8.47, 8.09, 148 DS, 123/8.13; 418/38, 36, 210; 74/70

[56] References Cited
UNITED STATES PATENTS

| | | | |
|---|---|---|---|
| 1,778,182 | 10/1930 | Bullington | 123/8.47 X |
| 1,790,534 | 1/1931 | Chevallier | 123/8.47 |
| 2,373,791 | 4/1945 | Stewart | 123/8.47 |
| 2,413,589 | 12/1946 | Snyder | 123/8.47 X |
| 2,649,080 | 8/1953 | Mallinckrodt | 123/8.47 |
| 2,852,006 | 9/1958 | Mallinckrodt | 123/8.09 |
| 3,381,669 | 5/1968 | Tschudi | 123/8.47 |
| 3,505,981 | 4/1970 | Turnbull | 123/8.47 |
| 3,645,239 | 2/1972 | Cena | 123/8.47 X |
| 3,857,369 | 12/1974 | Sabet | 123/8.47 X |

Primary Examiner—Clarence R. Gordon
Attorney, Agent, or Firm—Guy A. Greenawalt

[57] ABSTRACT

An orbital rotary piston-type internal combustion engine in which a series of pistons are mounted for cooperation on a pair of rotors which are carried on a drive shaft and travel in an annular combustion chamber, with associated pre-combustion chambers which are charged with rich fuel-air mixture while the annular combustion chamber is charged with a relatively lean fuel-air mixture, the mixture in the pre-combustion chambers being ignited by primary spark plugs and the expanding gas being forced through ports into the annular combustion chamber where secondary spark plugs adjacent the ports assist in more complete combustion and help force the pistons past exhaust ports, and with a variable ratio, overriding clutch-bearing for transmitting power from the rotors to the drive shaft, a solid state ignition system, a pressurized fuel injection system, a drive shaft mounted timing system and an electromagnetic controlled starting device, the disengagement of the latter being effected by means of an engine velocity sensitive switch.

19 Claims, 16 Drawing Figures

Fig-1

FIG_2

FIG_6_

FIG_8A_

FIG_8B_

FIG_9A_

FIG_9B_

FIG_9D_

FIG_9C_

ROTARY INTERNAL COMBUSTION ENGINE

The invention relates to internal combustion engines or power plants and is more particularly concerned with improvements in an orbital rotary piston engine which may be liquid or air cooled and which may be operated with any of the common combustible fuels or gases to provide power output for driving vehicles or any other power driven equipment or accessories.

Various types of internal combustion engines, motors, or power plants, have been developed for driving land vehicles, vessels and other driven apparatus. The most commonly used power plant, particularly, for driving vehicles is the familiar internal combustion engine which operates on gasoline and which comprises a cylinder head in which pistons carried on a crank shaft are reciprocated by explosion of a gas-air mixture ignited by head mounted spark plugs, with cam operated poppet valves, push rods and a flywheel, all governed by means of relatively complicated timing devices and lately requiring anti-pollution emission or exhaust mechanisms. While such engines have enjoyed great success commercially, their limitations have been well recognized and they have become more burdensome economically, particularly with respect to lack of sufficient fuel economy, high pollution characteristics and purchase and maintenance costs.

Another type of internal combustion engine or power plant which has generally been used for driving heavier equipment, such as, railway engines, heavy trucks, and the like, is the Diesel engine, which also generates power in a crankshaft by means of shaft carried reciprocating pistons, with a poppet valve complex of cams, pushrods, and valve springs, governed by means of timing devices and operating on a liquid hydrocarbon akin to fuel oil, with much the same limitations as the gasoline engine.

Another type of engine which has been produced utilizes a revolving block in which pistons reciprocate and produce rotary motion in a power output shaft through cams and gears, as distinguished from the crank and crankshaft arrangement of the conventional reciprocating piston engines. This type engine has not achieved any success due to its high cost and lack of advantages over other types.

Another engine which has been devised utilizes a scissor-type design which is analogous to the conventional reciprocating piston engine except that the pistons travel in a circular or an orbital path instead of an up and down path. The TSCHUDI rotary engine, which is the best known of this type design, utilizes pistons traveling around a toroidal cylinder with intake, compression, combustion and exhaust occurring simultaneously in different parts of the toroidal chamber. Two rotors are employed with a set of two pistons affixed 180° apart on each rotor, one rotor traveling at a constant angular velocity and the travel of the other rotor controlled by a complex gear and crank arrangement enabling the associated pistons to accelerate and decelerate so that the volume of the combustion chambers between pistons can be varied in a prescribed manner. Shock loads associated with starting and stopping the rotors at high speeds by means of complex gear and crank arrangements can create problems in every day use under normal or emergency or heavy duty operational conditions in an engine of this type design. Also, there is no possible way to increase power output by increasing the number of combustion chambers except by increasing the diameter of the toroidal cylinder or adding units in line, either of which will increase size or weight ratio to horse-power output and raise production costs beyond acceptable limits.

The so-called ROTATOR type rotary engine, introduced rather recently, employs multiple rotors having simple rotary motion with an equal number of pistons affixed to each rotor. Each rotor is attached to a backstop clutch permitting free wheeling rotary motion and allowing each set of pistons to travel in a common toroidal cylinder with fuel intake, compression, combustion and exhaust occurring simultaneously in different angular parts of the toroidal chamber and the sequence of events between pistons affixed to the first rotor being repeated between the pistons affixed to the second rotor. There is no positive control of the free wheeling rotary motion which results in inconsistent combustion ratios and lack of control of the RPM of the engine. Consequently, this design is not fully developed and is considered experimental.

The WANKEL rotary engine, presently in use as a power plant for vehicles, produces rotary motion power output by means of a three cornered rotary element mounted eccentric to a drive shaft and traveling in one direction in a toroidal chamber which has peripheral intake and exhaust ports and which is divided by the rotary element into three smaller chambers, each of which is analogous to the cylinder in the standard reciprocating piston engine. To increase the volume of each small chamber each segment of the rotor rim is recessed. During the combustion-expansion phase unburned gas tends to flow at high velocity away from the combustion zone with the result that part of the charge is unburned which limits performance and increases air pollution characteristics sufficiently to require anti-pollution devices in order to meet anit-pollution regulations. In addition, poor fuel comsumption and the need for costly production machinery, added to poor adaptability for variations in displacement and in models renders this type engine less attractive for mass production.

It is a general object of the present invention to provide an improved orbital rotary internal combustion engine which is so constructed and arranged as to provide a power plant having greatly improved power ratio in relation to overall weight, with highly efficient fuel comsumption resulting in greater economy in its use and in minimum exhaust pollution.

A more specific object of the invention is to provide an orbital rotary engine adaptable to the use of conventional fuels and suitable for powering vehicles and other power driven apparatus which has only three basic moving parts and which does not require many of the associated elements of the engines heretofore provided, such as, valves and valve lifters, crank and crankshaft, flywheel, complicated time setting devices, oil pump, gears, and the like, and which will operate with maximum efficiency in the burning of fuel so as to meet air pollution requirements without the addition of complicated anti-pollution devices.

A still more specific object of the invention is to provide an improved internal combustion engine of the orbital rotary piston type which utilizes a series of pistons mounted for co-operation on the periphery of a pair of rotors which are carried on a drive shaft and travel in an annular combustion chamber constituting a working chamber in a housing having associated precombustion chambers which are charged with a rich fuel air mixture while the working chamber is charged with a lean fuel-air mixture, provision being made for primary spark plug ignition of the rich mixture in the pre-combustion chambers, with the expanding gas forced through ports into the working chamber, where secondary spark plug ignition of the lean mixture insures more complete combustion and helps force the pistons past exhaust ports, and which further utilizes a variable ratio overriding clutch bearing for transmitting power from the rotors to the drive shaft, together with a pressurized fuel injection system and a solid state ignition system.

A further specific object of the invention is to provide an improved orbital rotary piston engine of the character described with a simple drive shaft mounted timing system and an electromagnetic controlled starting arrangement, with starter disengagement being by means of an engine velocity sensitive switch.

These and other objects and advantages of the invention will be apparent from a consideration of the orbital engine and associated elements which are shown by way of illustration in the accompanying drawings wherein:

Figure 1:
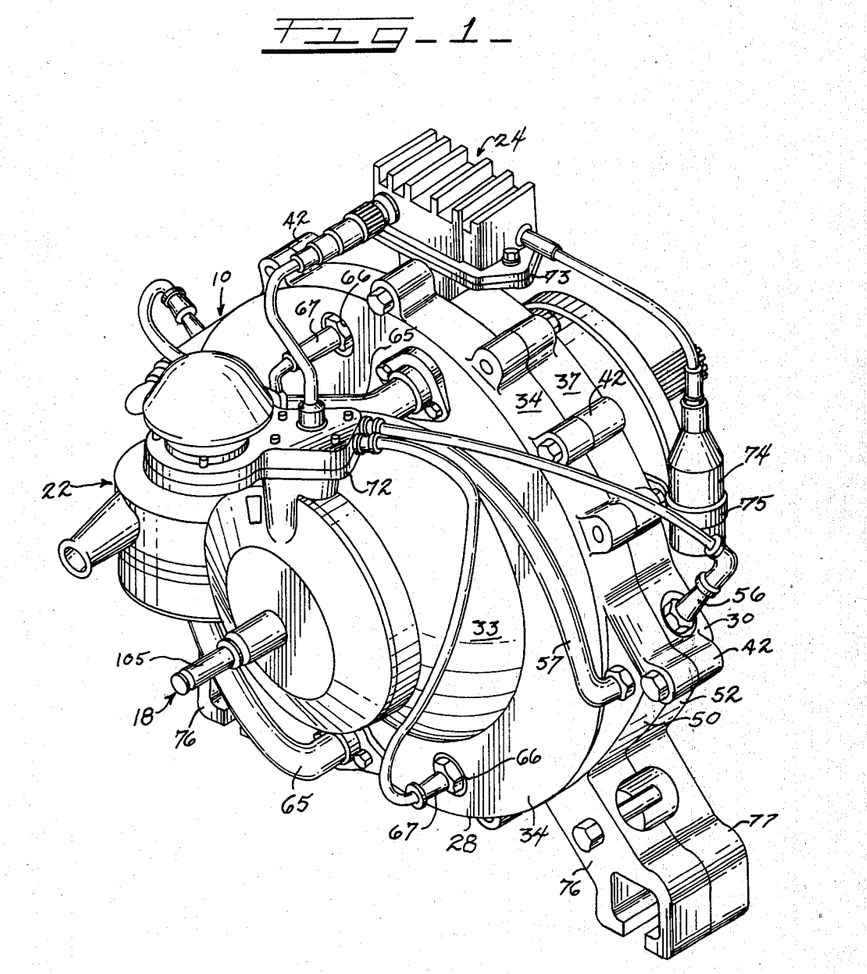
FIG. 1 is a partially schematic, perspective view of an orbital engine which embodies therein the principal features of the invention, with the starting mechanism not being visible.
Figure 6:
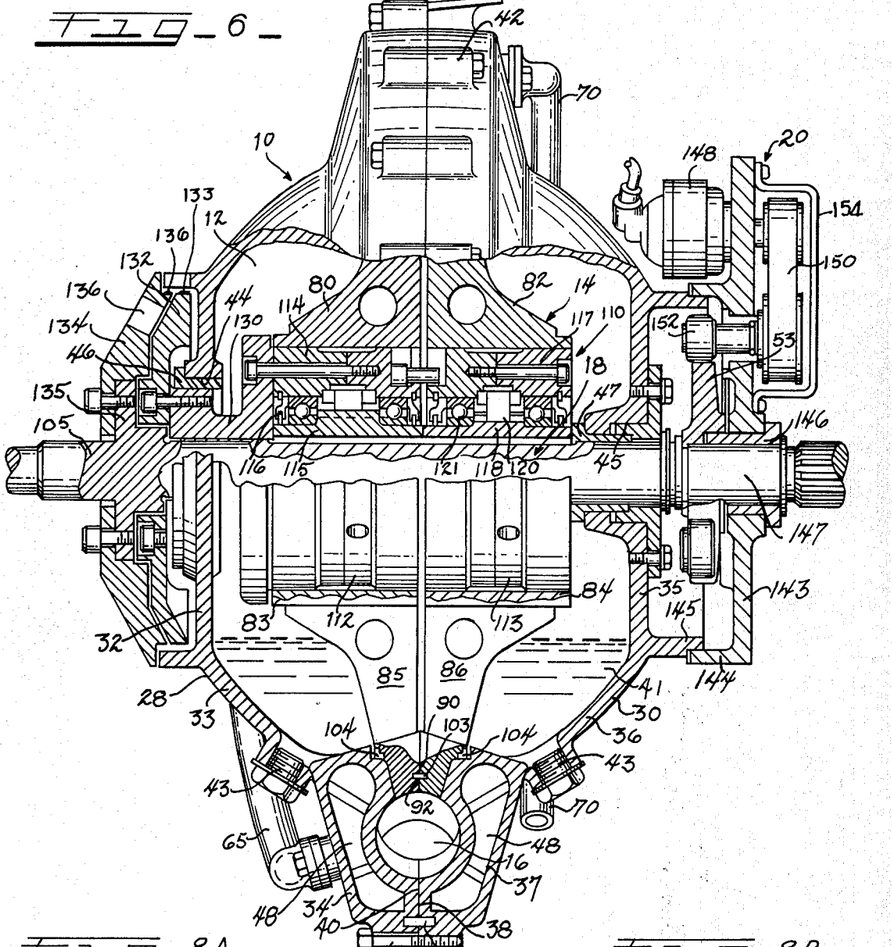
FIG. 6 is a veiw partially in elevation and partially in vertical section through the axis of the drive shaft assembly and including details of a silent starting mechanism associated with the engine of FIG. 1.

Referring first to FIGS. 1 and 6, there is illustrated a power plant in the form of a rotary internal combustion engine which embodies the principal features of the invention, in a preferred manner, the illustrated engine being particularly adapted for use as a power means, or power source, for driving a vehicle or other transportation device.

The form of the engine illustrated in FIGS. 1 and 6 comprises a two part or two section cylindrical housing 10 which encloses a central chamber 12 for accommodating a piston carrying rotor assembly 14 and an annular combustion chamber or working chamber 16 in which the pistons travel, the chamber 16 being formed in mating annular rim sections of the two part housing. The rotor assembly 14 is mounted on a power output or drive shaft assembly, indicated at 18 in FIG. 6, which extends through the center of the cylindrical housing 10 and along the axis of the internal compartment or chamber 12 which is formed within the housing 10. A starter mechanism 20 is shown associated with the drive shaft assembly 18 and mounted on the housing 10. A pressurized fuel injection system or assembly 22 (FIG. 1) is also provided and a solid state ignition system or assembly 24.

The housing 10 (FIGS. 1, 2 and 6) is formed in two parts or sections 28 and 30, which may be termed the forward and after halves, respectively, of the torus forming housing. The forward half section 28 comprises an end plate or end wall portion 32 with an inwardly curving portion 33 terminating in a peripheral rim section 34. The after half section 30 is formed in a like manner with an end plate or end wall portion 35, an inwardly curving portion 36 surrounding the same and terminating in a peripheral rim section 37. The rim portions or sections 34 and 37 have mating faces 38 and 40 and are adapted to be bolted together by co-operating bolt and socket assemblies 42 spaced about the peripheries of the rims 34 and 37 when the housing sections or units 28 and 30 are assembled so as to mount the drive shaft assembly 18 and associated rotor assembly 14, with the major portion of the latter enclosed in the chamber 12 formed between the end plate members 32, 33 and 35, 36. The chamber 12 serves also to contain a suitable fluid lubricant which is indicated at 41 in FIG. 6 in the bottom of the chamber 12. Drain outlets 43 are provided, together with a suitable oil inlet port (not shown). The end plate members 32 and 35 are apertured at 44 and 45 and the drive shaft assembly 18 is supported therein by bushings 46 and 47 in which opposite end portions of the output shaft assembly 18 are journaled for rotation. The confronting faces 38 and 40 of the rim sections 34 and 37 are annularly recessed and mated to provide the annular working chamber or combustion chamber 16 in which the pistons operate. The rim sections 34 and 37 are also recessed to provide suitable passageways 48 for circulating a cooling fluid therein. The bushings 46 and 47 are of the self-lubricating type and form a seal against the loss of lubricant from the chamber 12.

Figure 2:
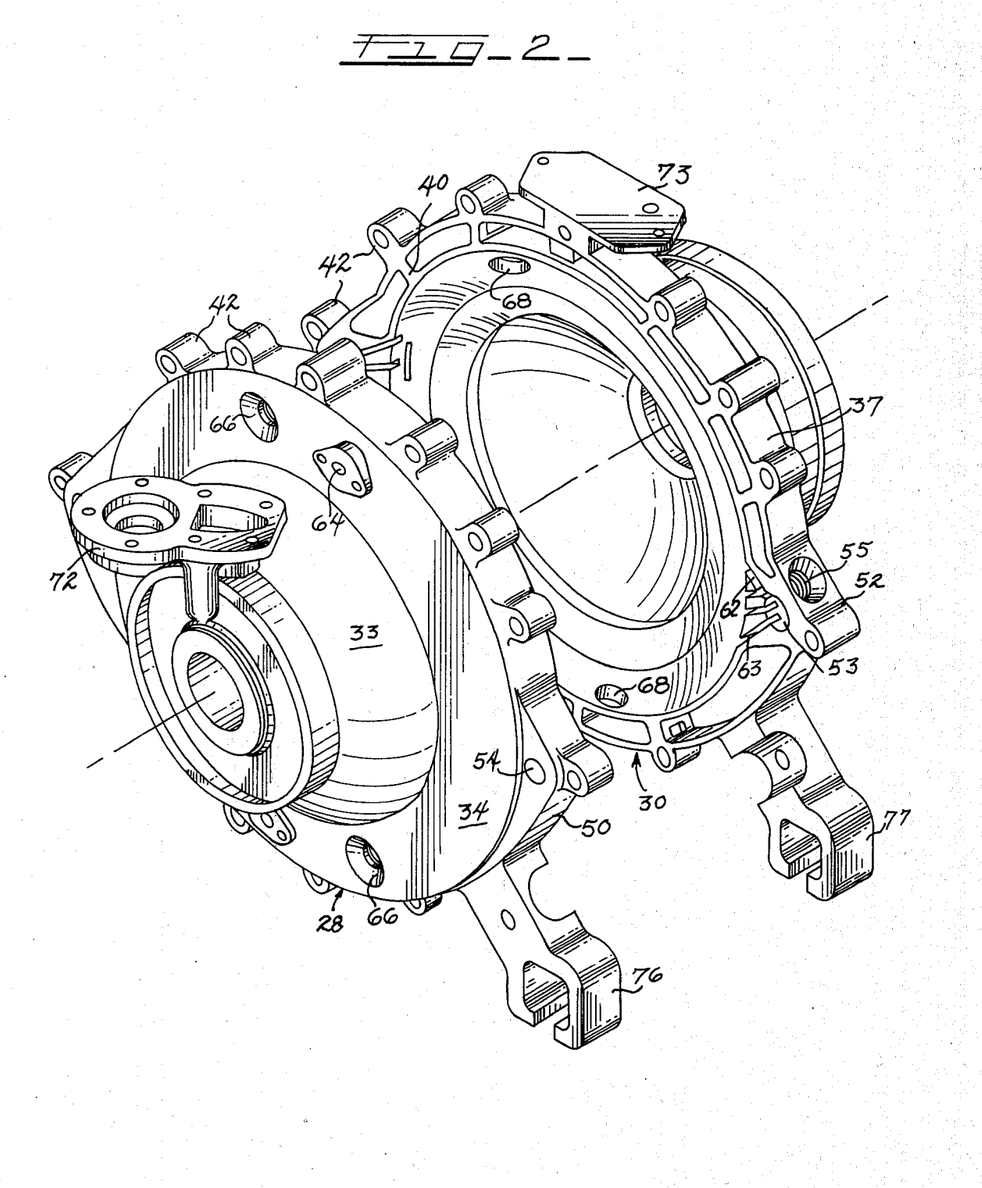
FIG. 2 is an exploded perspective view of the two sections of the basic torus housing for the engine of FIG. 1.
Figures 5, 7:
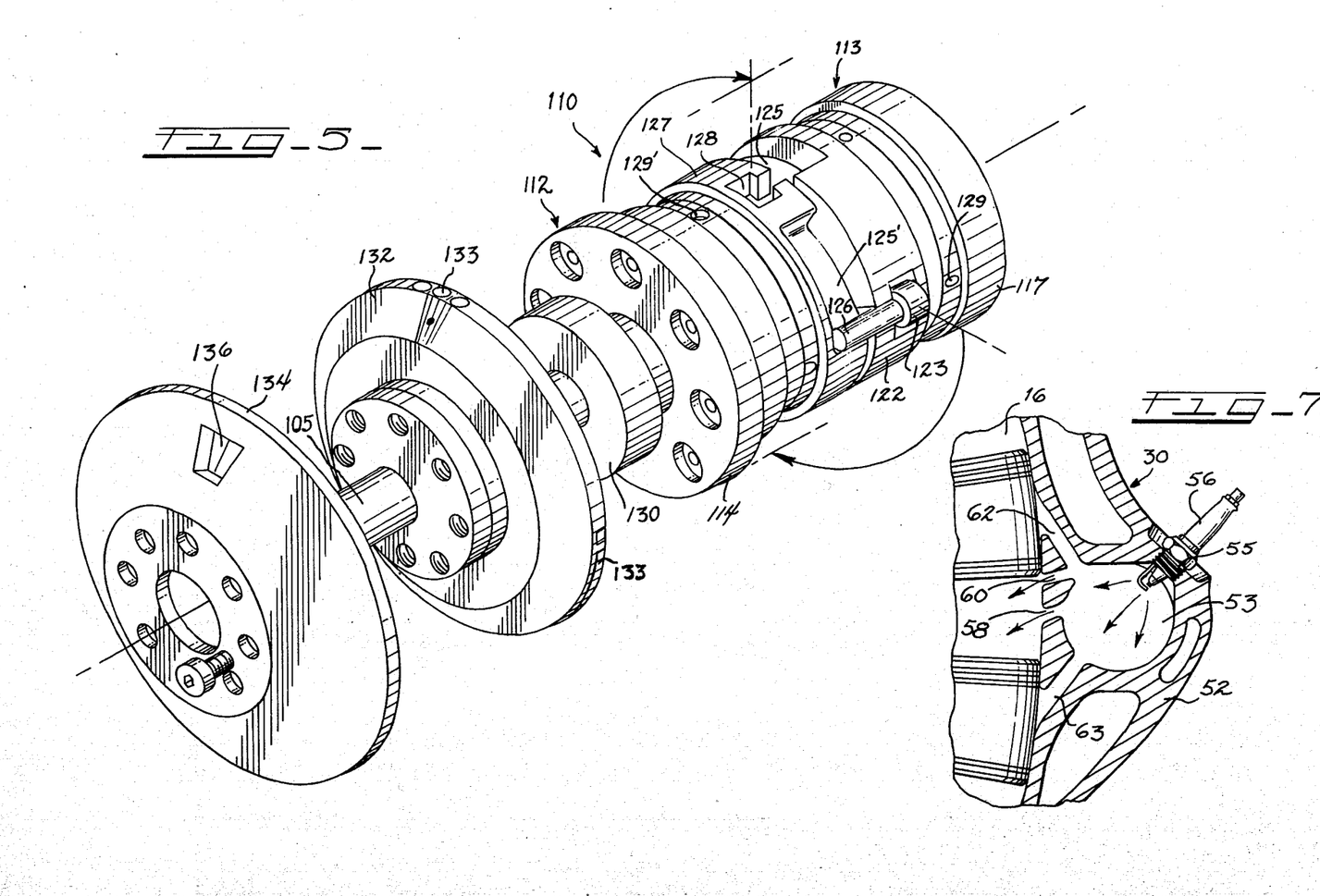
FIG. 5 is an exploded perspective view, to a larger scale, showing the elements of the variable ratio override clutch bearing assembly and also the timing discs which are carried on the power output shaft.
FIG. 7 is a fragmentary sectional view taken on a plane extending through a pre-combustion chamber in the housing member.

At spaced intervals the rim sections 34 and 37 are extended outwardly as indicated at 50, 52 and recessed so as to co-operate in providing precombustion chambers 53 which are equally spaced about the periphery of the housing 10. While only two precombustion chambers 53 are provided in the illustrated engine a larger number may be employed, each with an associated set of intake/exhaust ports and compression power stroke chambers. The precombustion chamber forming rim enlargements or extensions 50, 52 in the rim sections 34 and 37, have confronting faces which mate when the housing sections 28 and 30 are assembled and each mating pair thereof has transverse bores in the two halves which are connected to form a precombustion chamber 53. As shown in FIGS. 1, 2 and 7 each precombustion chamber forming rim enlargement 50 has a fuel receiving port 54 while the mating chamber 52 has a threaded bore forming a nest 55 for receiving a spark plug 56, the port 54 having connected thereto a fuel line 57 forming part of the fuel injection system 22.

The precombustion chamber 53 is connected to the working chamber 16 in which the pistons operate by means of two relatively short main passageways 58 and 60 (FIG. 7) through which a relatively rich mixture of the compressed and ignited gases are delivered to the working chamber 16, as hereinafter described. The ports or passageways 58 and 60 extend diagonally between the precombustion chamber 53 and the working chamber 16 so as to direct the gases into the chamber 16 in the general direction of piston advance and with a swirling action. A passageway 62 of longer length leads off the passageway 60 in a diagonal direction extending toward the trailing direction of piston travel and forming a bypass through which a relatively lean mixture is delivered to the working chamber 16, entering chamber 16 at a point spaced upstream of the direction of piston advance. A further passageway 63, also of longer length, extends diagonally from the precombustion chamber 53 to the working chamber 16 through which a portion of the gases from the precombustion chamber 53 enter the working chamber 16 at a point spaced downstream of the direction of piston advance.

The torus housing member 28 is provided with peripherally spaced, intake ports 64 (FIG. 2) which are connected to a fuel intake manifold 65 (FIG. 1) forming part of the pressurized fuel injection system 22. The housing member 28 is also provided, at points adjacent the fuel intake ports 64, with spaced, threaded bores forming nests 66 for receiving secondary ignition forming spark plugs 67 and the housing member 30 is provided with peripherally spaced exhaust ports 68 for exhausting spent gases from the working chamber 16 through an exhaust manifold which is shown at 70 in FIG. 6.

The housing member 28, in the form shown, is provided with a bracket 72 for supporting thereon portions of the fuel injection system 22 and portions of the solid state ignition system 24 while housing member 30 is provided with a bracket 73 for supporting other portions of the ignition system 24 which will include a high voltage coil 74 mounted on a bracket 75 on the member 30. The housing assembly 10 will also include a mounting means, which, in the form shown, may comprise radially extending, peripherally spaced, brackets 76 and 77. Outer sealing elements in the form of annular oil seal rings 78 are seated in suitable co-operating recesses in the outer margins of the faces 38 and 40 of the housing rim portions 34 and 37 to effect a seal between the housing members 28 and 30. Inner seal forming members will be hereinafter referred to in describing the rotor assembly 14.

Figure 3:
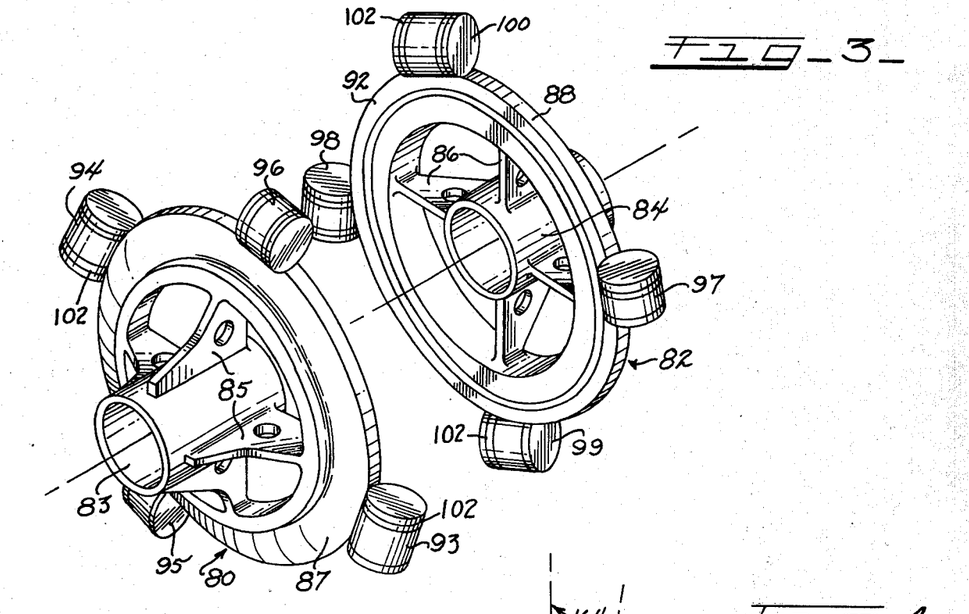
FIG. 3 is an exploded perspective view of the two piston carrying rotor assemblies which are an internal part of the engine of FIG. 1.

The piston carrying rotor assembly 14 (FIGS. 3, 4 and 6) comprises a pair of co-operating rotor members which may be designated the forward rotor 80 and the after rotor 82. The two rotors 80 and 82 are of like construction, each being in the general form of a wheel. Each of the rotors 80 and 82 has a cylindrical hub portion, identified by 83 on the forward rotor 80 and by 84 on the after rotor 82, with radially directed spokes 85 and 86 connecting the hub portions with outer rim formations 87 and 88. The rim portions 87 and 88 have mating faces 90 and 92 on the outermost edges of each of which four annular spaced pistons 93, 94, 95, 96 and 97, 98, 99, 100 are mounted in fixed relation, with the pistons on each rotor equally spaced peripherally. The pistons are of identical construction, each being barrel-shaped, closed end cylinders and each being mounted on the associated rim portion of the rotor and outboard thereof, with the long axis in the same radial plane in which the adjoining face 90 or 92 of the associated rim formation is located. The pistons may be formed of closed end cylindrical sections which are welded or otherwise secured to the annular rim sections and formed with the necessary surface contour for travel in the annular working chamber 16. They are each provided with expansion sealing rings, indicated at 102 in FIG. 3, which are of the same type and which function in the same manner as the piston rings on a piston of a conventional reciprocating piston type engine. They are equally spaced on the rotors 80 and 82 with the long axis extending in the path of travel when rotating in the working chamber 16. The rotors 80 and 82 are provided on their confronting faces 90 and 92 with co-operating grooves for confining therein an oil seal ring 103 (FIG. 6) to effect a seal between the rotors when assembled. On the opposite faces, ledges or shoulder formations are provided on which oil seal rings 104 are adapted to be seated for co-operation with internal shoulder formations on the housing members 28 and 30 to effect sealing between the rotors and the annular combustion chamber 16 which is formed between the housing rim members 34 and 37. The rotor rim sections are provided with suitable oil passageways (not shown) to provide for passage of sufficient lubricant into the working chamber 16. While sets of four pistons are shown on each of the rotors 80 and 82 which are paired for co-operative action in the working chamber 16 so as to form in operation two combustion chambers with two associated intake ports, two exhaust ports and two precombustion chambers, other arrangements may be employed. For example, each of the rotors may carry six pistons, equally spaced, and paired for co-operation in a working chamber so as to form, in operation, three combustion chambers and having associated therewith three intake ports, three exhaust ports, and three precombustion chambers, with proper angular location of the pistons and associated components.

Figure 4:
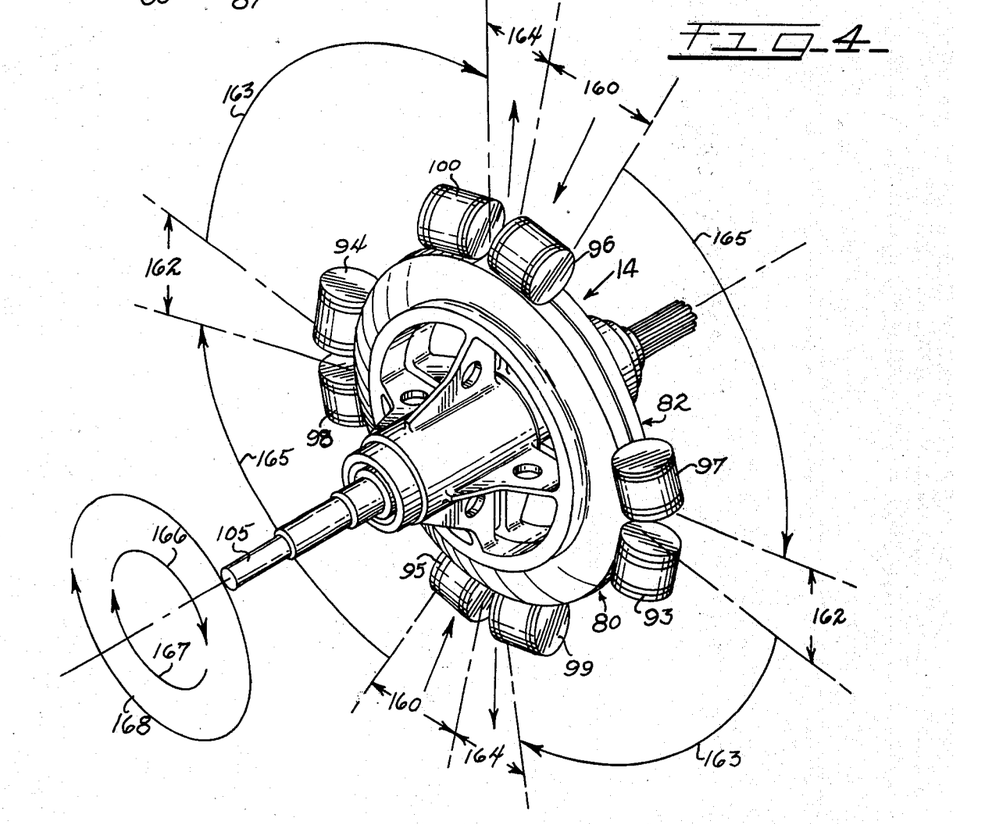
FIG. 4 is a perspective view showing the two piston carrying rotor assemblies affixed to the variable ratio override clutch bearing assembly on the power output shaft of the engine of FIG. 1.

The forward and after rotor assemblies 80 and 82 are mounted on the power output shaft 105 of the drive shaft assembly 18 as shown in FIGS. 4 and 6 by means of a variable ratio override clutch bearing assembly which means that there can be controlled, precisely, the over-all timing setting, combustion ratio setting and RPM operational control setting by one single setting for the desired performance of the power plant under any condition of use and for multiple uses. The clutch bearing assembly or mechanism 110 is shown particularly in the partially exploded view of FIG. 5. Basically the clutch bearing assembly 110 comprises a forward section or clutch complex 112 and an after section or clutch complex 113 on which the forward rotor assembly 80 and the after rotor assembly 82, respectively, are mounted for operation independently of each other, so that each of the rotor assemblies 80 and 82 will have an independent driving connection with the output shaft 105 when the associated pistons are urged in the same direction. The outer race member 114 of the forward clutch complex 112 is keyed within the hub 83 of the forward rotor 80. The inner race member 115 (FIG. 6) of the forward complex 112 is keyed to the output power shaft 105 with intermediate free floating sprag power drive transferring member and associated free floating variable speed control members, indicated at 116, between the race members, the former constituting a part of the outer race member and having sprags equally spaced diametrically inside and riding on the outer face of the inner race member. Variable speed rotation is controlled through the free floating bearing member by means of pneumatically pressurized action against the bearing in sliding movement. The engagement or disengagement action may be controlled by means of natural centrifugal forces. The outer race member 117 of the clutch complex 113 is keyed within the hub 84 of the after rotor assembly 82 while the inner race member 118 is keyed on the output shaft 105 with the intermediate free floating sprag power transfer member and associated free floating variable speed control member indicated at 120. Roller bearing members are indicated at 121. As shown in FIG. 5, the clutch complex 113 for the after rotor assembly 82 includes the free floating sprag ring 122, which is made in two parts for convenience in production and assembly with a set of two floating roller bearings 123 located 180° apart, only one being shown in FIG. 5, and with two override cam-like raisers 125 at 90° relative to the free floating bearing arrangement and at 180° apart on which the sprag rollers 126 ride, the latter being free of the rollers 123. The clutch complex 112 includes a like sprag ring member 127 with free floating bearings, a roller nest or socket 128 only being shown in FIG. 5, and cam-like raisers 125'. Suitable oil passageways are provided, where required, as indicated at 129 and 129'. All other elements of these assemblies are of well known construction.

The drive shaft 105 has a radial extension 130 (FIG. 6) which has a slip fit over the drive shaft and which is bolted to the outer race 114 of the forward clutch complex 112. Member 130 has bolted to it a forward compression and combustion ratio and ignition timing-engine velocity index disc 132 with electromagnetic fields 133. An after compression and combustion ratio and ignition timing engine velocity coordinating index disc 134 is bolted to radial flange 135 on the drive shaft 105 which disc 134 also has electromagnetic fields on an inside annular ledge formation, indicated at 136, in FIG. 6. The disc 134 has an adjustment setting index window 137. The forward housing 28 has an annular outer flange 138 covering the outer edge of the innermost timing disc 132 and the ledge 136 of the outermost disc 134 with a port 140 for co-operating with the timing mechanism which is mounted on the bracket 72 (FIGS. 1 and 2).

An electromagnetic silent starter assembly 20 (FIG. 6) is mounted on the after housing 30 by means of a bracket forming mounting plate 143 which has an annular flange 144 seating on the edge of the outboard flange 145 on the housing 30. A bushing 146 accommodates the drive shaft portion 147. A starter motor 148 drives a belt connection 150 with a drive element 152 which is engaged electromagnetically with the disc element 153 on the drive shaft 105 and disengaged by means of an engine velocity force switch-off. The assembly includes a cover member 154 for the belt drive 150.

The principles of operation of the engine are illustrated in FIGS. 4 and 7 to 11. Referring first to FIG. 4 and assuming that the rotor assemblies 80 and 82 are properly mounted on the forward and after clutch complexes 112 and 113, and the pistons are operating in the annular working chamber 16, with proper timing of fuel combustion the cycle of events will result in clockwise rotary motion of the power output drive shaft 105. The cycle of internal events at one instant is schematically illustrated with the direction of travel indicated by arrows. Intake port zones in the working chamber 16 are indicated at 160. Precombustion cavity ignition and basic combustion zones are indicated at 162. Expansion zones for ignited air-fuel gases which provide a power stroke, are indicated at 163, which is directed toward a secondary ignition and exhaust port zone 164. The compression action zones are indicated at 165. In FIG. 4 the piston 96, which is part of the forward rotor assembly 80, has drawn a lean air-fuel mixture into the working chamber through intake ports 58 and 60 (FIG. 7) ahead of its forward or leading face and is closing the intake ports while its forward face or side is advancing toward piston 97 on the after rotor assembly in the compression zone 165 to compress the air-fuel mixture against the back or trailing face of piston 97. The forward face of piston 97 is approaching the rearward or trailing face of piston 93 with the basic combustion zone between them, the piston 97 decelerating or slowing down while piston 96 is accelerating and closing in on the piston 97. Both pistons 96 and 97 are traveling at a constant variable forward velocity, the velocity of piston 97 being controlled by the floating bearing and the accelerated forward motion of piston 96 being controlled by piston 93. The piston 93 is part of rotor assembly 80 which is accelerated by the events occurring in the basic combustion zone 162 where there is entrance of expanded gases from ignition of rich air-fuel mixture in the precombustion chamber and the lean air-fuel mixture is ignited by entering gases from the precombustion chamber with the ignited gases acting on the back face of piston 93 and activating power stroke of piston 93. The piston 93 advancing toward and nearing the back or trailing face of piston 99 forces the latter to uncover and exhaust port and aided by secondary ignition of expanded gases exhaust of the expanded gases through the exhaust port occurs. The secondary ignition firing which is timed to occur in the combustion zone at the end of the power stroke and which results in exerting force against the trailing end of the piston, is simultaneous with precombustion ignition firing. The power stroke action of piston 93 is transmitted onto the drive shaft 105 through the forward rotor 80 and the associated clutch complex 112 resulting in driving the shaft 105 for one half revolution. The action of the forward rotor assembly 80 in driving the shaft 105 for one half revolution, as indicated at 166 in FIG. 4, is followed by like action of the after rotor assembly 82 driving the shaft 105 for a half revolution indicated at 167, the combined action of the two rotor assemblies resulting in a full revolution of the shaft 105 as indicated at 168. In the arrangement shown for one full power shaft revolution there are four intakes of fuel, four precombustion ignitions, four compressions, four expansion power strokes and four exhausts with secondary ignitions, with a full revolution of each of the rotor assemblies. When there are a larger number of rotors employed in the design of the engine there is only a single ignition firing setting for all combustion chambers for one half revolution of the power shaft. The constant pressure fuel injection system governs the ratio of the fuel-air mixture according to the operation of the power output shaft. It draws air under vacuum from the intake chamber of the power plant and governs the amount of air in the air-fuel mixture according to the RPM of the output shaft, automatically. That is, the higher the RPM, or acceleration, the more air is drawn in to mix with the fuel and the lower the RPM the smaller the amount of air drawn into the mix. When properly adjusted to proper mix to provided for most efficient operation.

Figure 9A:
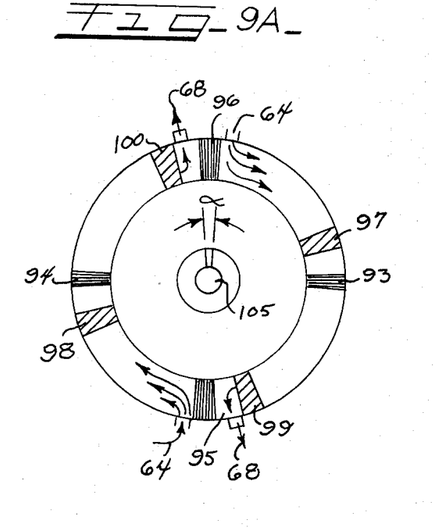
FIGS. 9A, 9B, 9C, and 9D are diagrammatic views illustrating the full cycle of internal events in an engine, as shown in FIG. 1, with two combustion chambers provided by co-operations of the four pistons on the two rotors.
Figure 9B:
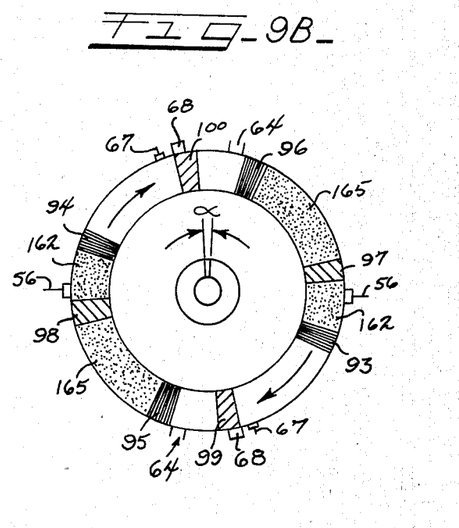
Figure 9C:
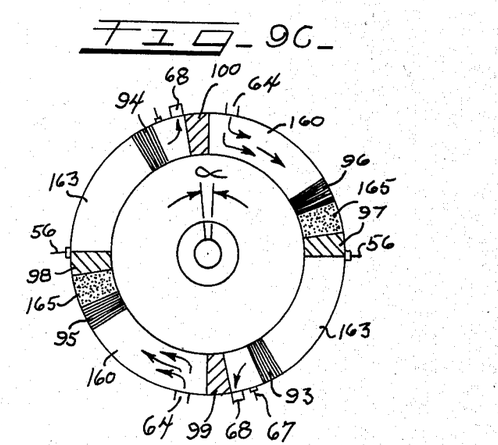
Figure 9D:
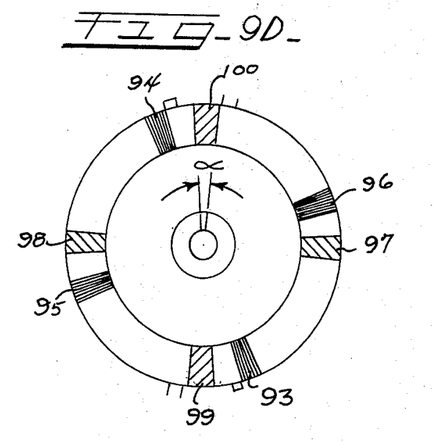

In FIGS. 9A, 9B, 9C and 9D there is illustrated schematically a full cycle of internal events during one revolution of the forward rotor assembly 80 or one full revolution of the drive shaft 105. As shown, there are four pistons 93, 94, 95, 96 on the forward rotor assembly 80 co-operating with a like number 97, 98, 99, 100 on the after rotor assembly 82. The pistons operate to divide the working chamber 16 into two compression chambers or zones 165 and there are two pre-combustion chambers 53 supplying ignited air-fuel mixture to the compression chambers or zones 165 through the ports 58, 60, 62 and 63 (FIG. 7). The lean air-fuel mixture enters the working chamber through the intake ports 64 (FIG. 9A) ahead of the pistons 96 and 95 and is compressed in the compression chambers 165 (FIG. 9B) formed between the co-operating pistons 96, 97 and 95, 98 while rich air-fuel mixture is precombustion chambers 53 are ignited by spark plugs 56 and the ignited gases pass through ports 58, 60, 62 and 63 igniting the lean air-fuel mixture which is compressed in the compression chambers 165. The resulting expanding gas accelerates the pistons in their forward power stroke travel while the forward travel of the co-operating pistons 97, 98 99 and 100 is restrained by operation of the clutch mounting. The secondary ignition spark plugs 67 are fired simultaneously with the firing of the spark plugs 56 in the precombustion chambers and help complete the burn up of the gases, while lending additional force to the advancing movement of the pistons 96, 95. The latter advance to open the exhaust ports 68 (FIG. 9C) for exhausting the spent gases which are free of objectionable pollution elements as measured by present environmental standards. The intake ports 64 are opened upon advance of the pistons and new lean air-fuel mixture is drawn into the working chambers. The full cycle of events of the forward rotor 80 is completed with a half rotation or revolution of the drive shaft 105 and, diagrammatically as illustrated in FIG. 9D, the set of pistons 97, 98, 99 and 100 on the after rotor 82 are in position to repeat a like cycle of events so as to obtain a full revolution of the drive shaft 105. The timing discs 132 and 134 are set as indicated by the symbol α in the views to control the combustion ratio, ignition timing and engine velocity through the operation of the override clutch assemblies 112 and 113.

Figure 8A:
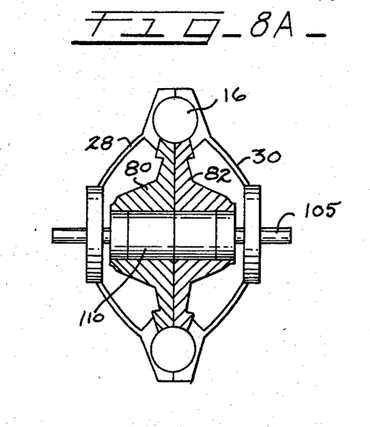
FIG. 8A is a fragmentary sectional view, largely schematic, showing a single toroidal combustion chamber arrangement as provided in the engine of FIG. 1.
Figure 8B:
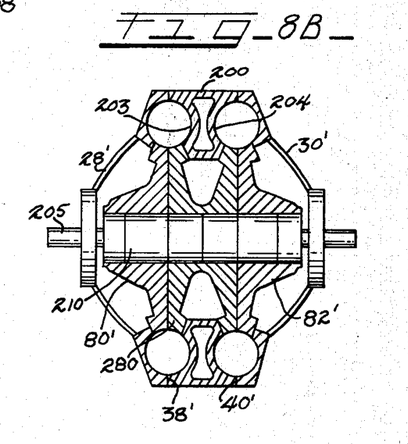
FIG. 8B is a fragmentary sectional view, largely schematic, showing a double toroidal combustion chamber constituting a modified arrangement for the engine.

FIGS. 8A and 8B illustrated diagrammatically and by way of comparison as single torroidal (FIG. 8A) cylinder design of the character herein described and a double torroidal cylinder design (FIG. 8B). The dual design may employ the forward and after cylinder forming housings 28° and 30' of the same construction as the forward and after cylinder housings 28 and 30 of the single cylinder design with a central housing member 200 having two half cylinder formations 202, 203 facing in opposite directions to mate with the cylinder forming faces 38' and 40' of the housing members 28' and 30'. The forward and after rotor assemblies 80' and 82' may be the same as the assemblies 80 and 82 in the single cylinder design while the central rotor assembly 280 is double faced so as to co-operate with the assemblies 80' and 82', respectively, with a double set of pistons so that one set of the pistons on 280 will travel in the work chamber in the forward cylinder and the other set of pistons on 280 will travel in the work chamber of the after cylinder configuration. The rotor assemblies will, of course, be mounted on the drive shaft 205 by means of multiple variable ratio override clutch assemblies 210. The dual cylinder and similar multiple arrangements or designs will enable the power input to be greatly increased with a comparatively small increase in the over-all size of the engine and manufacturing cost.

Figure 10:
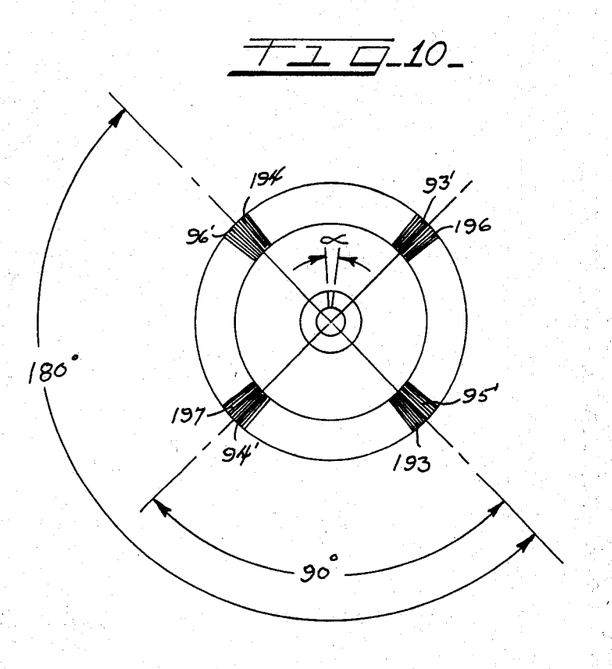
FIG. 10 is a diagrammatic view illustrating the cycle of events in the first two quarters of a power shaft revolution.

In the diagrammatical illustration of FIG. 10, the pistons 93' and 94' of the forward rotor assembly 80' (FIG. 8B) are in combustion-ignition position and the pistons 193 and 194 of the central and after rotor assemblies 280 and 82' are in combustion-ignition positions at 90° angular relation to the pistons 93' and 94'. In this relation the sequence of events in the cylinders will take place simultaneously in both torroidal chambers in a manner similar to that described with reference to the single cylinder design with the other pistons, such as 196, 197, and associated parts being in a similar relation.

Figure 11A:
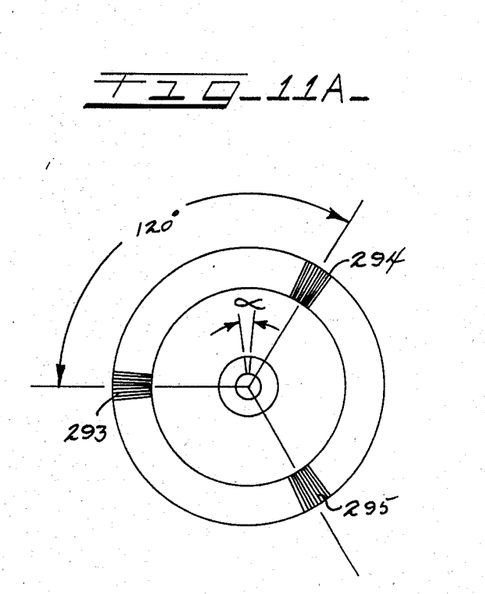
FIGS. 11A and 11B are diagrammatic views further illustrating the cycle of events in the operation of the engine.

In FIG. 11A there is illustrated diagrammatically a form of the invention which employs a single torroidal cylinder with three combustion chambers, six pistons and three precombustion chambers. The pistons 293, 294 and 295 are equally spaced on a forward rotor assembly and illustrated in combustion-ignition zones. The co-operating pistons on the after rotor assembly are at a 120° relation to each other and in a manner similar to the two combustion chamber arrangement the pistons divide the work chamber into three combustion chambers. There will be three fuel intakes, three compressions, three precombustion ignitions, three expansions and three exhausts for each half revolution of the drive shaft or double that for one full revolution of the same.

Figure 11B:
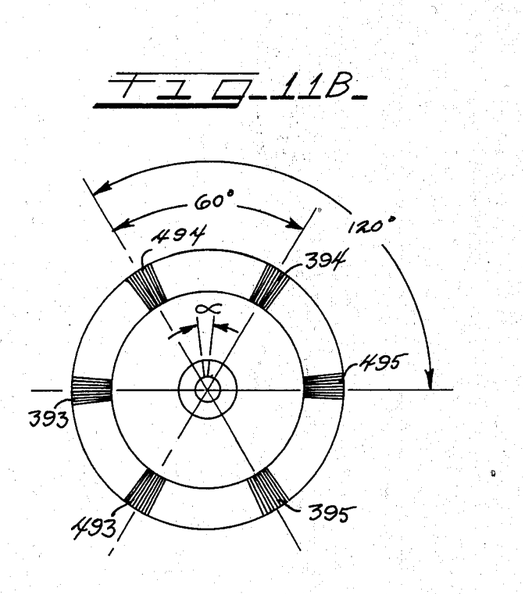

In the diagrammatical illustration of FIG. 11B a dual torroidal cylinder configuration (FIG. 8B) is envisioned with three pistons 393, 394, 395 on the forward rotor assembly and co-operating pistons 493, 494 and 495 on the co-operating central rotor assembly, and with a corresponding piston on the after rotor assembly and the co-operating central co-operating central rotor assembly. The pistons 393, 394, 395 are arranged at 60° relative to the pistons 493, 494 and 495 with the after rotor pistons arranged in the same relationship so that operation of the complex results in six combustion-ignitions for one half a revolution of the drive shaft or a total of twelve for a full revolution in a manner similar to the operation of the two combustion chamber arrangement.

The engine in the several forms herein disclosed in capable of operating on a variety of conventional engine fuels to provide power for driving various types of vehicles and any other power driven equipment for which it may be found to be a suitable driving means. It is constructed with few moving parts which reduces maintenance due to wear to a minimum. It can be readily manufactured using conventional production methods, machinery and tooling. It is characterized by economical fuel consumption minimum exhaust pollution, low level of noise pollution and low cost maintenance and repair.

I claim:

1. An internal combustion engine of the orbital rotary piston-type comprising an external housing forming an annular combustion chamber, a drive shaft journaled in said housing, a pair of piston carrying rotors, variable ratio overriding clutch bearing means mounting said rotors on said drive shaft for rotation in one direction and operable to form a power driving connection with said drive shaft in said one direction when there is predetermined pressure on the trailing side of the leading pistons, said pistons being mounted in spaced relation on the periphery of said rotors and aligned for travel in said annular combustion chamber, the pistons on the one rotor being positioned relative to the pistons on the other rotor so as to co-operate in relatively movable paired relation in dividing the combustion chamber into a plurality of work zones including fuel intake, compression, combustion, expansion and exhaust zones, said combustion chamber having fuel intake ports operative in the fuel intake zones and exhaust ports operative in the exhaust zones, means forming precombustion chambers disposed for operation adjacent said combustion zones and having ports forming passageways into the combustion zones, means for supplying fuel in predetermined fuel-air mixture to the fuel intake zones and the precombustion chambers, means for igniting the fuel-air mixtures in the combustion zones and the precombustion chambers in predetermined timed relation to the movement of said pistons so as to exert pressure on the leading pistons whereby the travel of the leading pistons is accelerated in the expansion zones and power is transmitted to said drive shaft.

2. An internal combustion engine as set forth in claim 1 wherein said external housing comprises a pair of housing members of generally circular configuration having mating faces which are recessed to form, when secured together, a central chamber and said annular combustion chamber, with said drive shaft journaled in coaxial relation therewith in said central chamber.

3. An internal combustion engine as set forth in claim 1 wherein said external housing comprises forward and after torus housing members having mating faces with outer rim portions which are recessed so as to co-operate in forming said annular combustion chamber when secured in mating relation and wherein said precombustion chamber forming means comprises outwardly extended rim enlargements spaced about the periphery thereof with mating face portions which are recessed and provide said precombustion chambers when secured in mating relation.

4. An internal combustion engine as set forth in claim 3 wherein said precombustion chambers have passageways forming said ports into said annular chamber which are inclined in a forward and in a rearward direction relative to the direction of piston advance and which direct gases resulting from ignition of fuel mixtures in said precombustion chambers into said combustion zones with a swirling action.

5. An internal combustion engine as set forth in claim 1 wherein said external housing comprises forward and after torus housing members having mating faces with peripheral rim formations which are recessed so as to provide said annular combustion chamber when secured in mating relation and which have recessed rim enlargements spaced about the periphery which constitute said precombustion chamber forming means when said rim formations are secured together.

6. An internal combustion engine as set forth in claim 1 wherein said means for supplying fuel to the fuel intake zones and the precombustion chambers comprises a constant pressure fuel injection system.

7. An internal combustion engine as set forth in claim 1 wherein said means for igniting the fuel-air mixture comprises a solid state ignition system and a co-operating drive shaft mounted timing system.

8. An internal combustion engine as set forth in claim 1 wherein said means for igniting the fuel-air mixture comprises a solid state ignition system and a timing system which includes co-operating timing discs mounted on said drive shaft and said clutch means and controlled by rotation of said drive shaft and said rotors.

9. An internal combustion engine as set forth in claim 1 wherein said external housing comprises separable forward and after torus members with mating faces which are recessed so as to form a chamber between said housing members in which said drive shaft is journaled with seal forming bearing means so as to enclose said rotors in said chamber and enable said chamber to contain a supply of lubricant.

10. An internal combustion engine as set forth in claim 1 wherein said external housing comprises generally cylindrical forward and after housing members which are connected so as to form a central chamber between them in which said drive shaft is positioned so as to mount said rotors therein, said housing members having mating rim portions which are recessed to form said annular combustion chambers and means sealing said chambers against the passage of lubricant whereby said central chamber may contain a quantity of lubricant.

11. An internal combustion engine comprising an external torus housing constructed and arranged to form an internal chamber with a peripheral portion constituting an annular combustion chamber, a drive shaft journaled in said housing with its axis extending along the axis of said combustion chamber, a pair of piston carrying rotors, means mounting said rotors on said drive shaft with the axis thereof coinciding with the axis of said drive shaft and operable while advancing the pistons to form a power driving connection with said drive shaft when there is predetermined pressure on the trailing sides of the pistons, a set of pistons mounted in spaced relation on the periphery of each of said rotors, said rotors being disposed on said drive shaft so that the pistons on one rotor are in paired co-operative relation with the pistons on the adjoining rotor and are aligned for travel in said annular combustion chamber, said pistons of each pair being movable with the associated rotors so as to form in the combustion chamber successive fuel intake, compression, combustion, expansion and exhaust zones, said combustion chamber having fuel intake ports disposed to deliver fuel to the fuel intake zones which are formed between the pistons of each pair thereof, means forming precombustion chambers having ports opening into the combustion zones which are formed between the pistons of each pair thereof, and means for supplying fuel in predetermined fuel-air mixtures to the precombustion chambers and thence to the fuel intake zones, and means for igniting the fuel-air mixtures in the pro-combustion chambers in predetermined timed relation to the movement of said pistons in forming said zones so as to effect a power stroke by the leading piston of each pair thereof as the ignited fuel expands in the combustion zone and exerts a driving force against the trailing face of said leading piston.

12. An internal combustion engine as set forth in claim 11 wherein said means mounting said rotors on said drive shaft comprises variable ratio override clutch assemblies providing independent power transmission of each of said rotors to said drive shaft when the advance of pistons carried on said rotors is accelerated by pressure resulting from the ignition of said fuel-air mixtures.

13. An internal combustion engine as set forth in claim 12 wherein said clutch assemblies each include an outer race member keyed to a hub formation of the associated rotor, an inner race member keyed to said power output drive shaft and intermediate sprag power drive transferring member with associated free floating variable speed control member.

14. An internal combustion engine as set forth in claim 11 wherein said torus housing comprises generally cylindrical housing members having end wall formations at outer ends thereof in which said drive shaft is journaled and oppositely disposed open faces at the inner ends, means connecting said members so as to form between them said internal chamber and having lubricant sealing means so that a quantity of lubricant may be retained in said chamber.

15. An internal combustion engine as set forth in claim 11 wherein each said rotor has mounted thereon sets of pistons which co-operate in pair forming relation to divide said combustion chamber into three or more sets of fuel intake, compression, combustion expansion and exhaust zones, and wherein said combustion chambers has associated fuel intake ports, precombustion chambers and exhaust ports for co-operation with each set of zones.

16. An internal combustion engine as set forth in claim 12 wherein said means forming said precombustion chambers comprises an outwardly extended portion on said housing adjacent each said combustion zone with an internal fuel receiving chamber formed therein and having a plurality of angularly related passageways extending diagonally in opposite directions relative to the path of travel of the pistons and forming said ports into the associated combustion zone.

17. An internal combustion engine as set forth in claim 16 wherein one of said passageways is at an angle relative to the direction of piston advance to direct portions of the gases resulting from ignition travel and another one of said passageways is at an angle relative to the direction of piston advance to direct portions of said gases downstream of the piston travel.

18. An internal combustion engine as set forth in claim 11 wherein said means for supplying fuel comprises a constant pressure fuel injection system which is operative to provide a predetermined quantity of lean air-fuel mixture to the combustion chambers and a predetermined quantity of a rich air-fuel mixture to the precombustion chambers for ignition in said respective chambers.

19. An internal combustion engine as set forth in claim 11 wherein said means for igniting the fuel-air mixtures comprises a solid state ignition system including adjustably mounted control members in the form of discs which are carried on said drive shaft and connected to said drive shaft and said rotors, respectively.

* * * * *